United States Patent [19]

Fish

[11] Patent Number: 4,760,624
[45] Date of Patent: Aug. 2, 1988

[54] CLOSER/HOLDER WITH ACCESS SLIT

[76] Inventor: Ivan Fish, 2804 Carolina, NE., Albuquerque, N. Mex. 87110-3312

[21] Appl. No.: 911,351

[22] Filed: Sep. 24, 1986

Related U.S. Application Data

[63] Continuation-in-part of Ser. No. 647,973, Sep. 6, 1984, Pat. No. 4,644,610.

[51] Int. Cl.⁴ .................... B65D 77/10; F16B 2/20
[52] U.S. Cl. ................................ 24/30.5 S; 24/570
[58] Field of Search .......... 24/30.5 S, DIG. 28, 24/570, 571; 248/309.1; 211/70.6

[56] References Cited

U.S. PATENT DOCUMENTS

| | | | |
|---|---|---|---|
| 1,050,771 | 1/1913 | Leupold | 24/570 |
| 1,594,231 | 7/1926 | Winterhalter | 24/411 |
| 2,396,906 | 3/1946 | Windson | 24/30.5 S |
| 2,825,952 | 3/1958 | Van Driel | 24/570 |
| 2,881,990 | 5/1961 | Balderree, Jr. | 24/30.5 S |
| 3,170,213 | 2/1965 | Thomas, Jr. | 24/571 |
| 3,822,441 | 7/1974 | Paxton | 24/30.5 S |
| 3,962,757 | 6/1976 | Gedney | 24/30.5 S |
| 4,333,566 | 6/1982 | Holmes | 206/343 |
| 4,361,935 | 12/1982 | Paxton | 24/DIG. 28 |
| 4,509,231 | 4/1985 | Paxton | 24/30.5 S |
| 4,571,779 | 2/1986 | Koerschner et al. | 24/30.5 S |

FOREIGN PATENT DOCUMENTS

| | | | |
|---|---|---|---|
| 77387 | 1/1962 | France | 24/30.5 S |
| 459872 | 9/1968 | Switzerland | 24/30.5 S |
| 2028413 | 3/1986 | United Kingdom | 24/30.5 S |

*Primary Examiner*—Victor N. Sakran
*Attorney, Agent, or Firm*—Deborah A. Peacock; Robert W. Weig

[57] ABSTRACT

A closing or holding device having at least one zig-zag shaped access slit. The access slit leads to an opening for placing an object, such as a plastic bag, to be closed or held. The opening may contain slots, teeth, threads, or other gripping means for better gripping the object. The device may contain a label section for descriptive or identifying purposes. The device may also have wrap indentations for guiding and closing the object.

5 Claims, 2 Drawing Sheets

CLOSER/HOLDER WITH ACCESS SLIT

CROSS-REFERENCE TO A RELATED APPLICATION

This application is a continuation-in-part application of U.S. patent application Ser. No. 647,973, now U.S. Pat. No. 4,644,610, entitled "A DISC SHAPED HOLDER WITH AN EXPANDABLE CENTER HOLE," to Fish, filed on Sept. 6, 1984, the teachings of which are incorporated herein by reference.

BACKGROUND OF THE INVENTION

Closing and holding devices in the prior art are generally ineffective in their closing and holding capabilities. One of the most common of these prior art devices is a small plastic tab with a generally circular and smooth inner closer opening and a short, straight access slit. When this device is used to close, for example, plastic bags on food products, the device can be easily rotated around the smooth, circular closer opening, indicating that a good seal has not been achieved. Moreover, the object can easily be pulled out of the closer opening because the slit is short and straight and thus does not offer much resistance.

U.S. Pat. No. 4,644,610, entitled "A DISC SHAPED HOLDER WITH AN EXPANDABLE CENTER HOLE," to Fish, discloses a zig-zag shaped grip (See FIG. 3 in the '973 application) which serves to better hold an object placed therein. This 9rip is surrounded by an open space.

Accordingly, it is an object of the present invention to provide a closing and holding device with improved closing capabilities.

It is a further object of the present invention to provide a closing and holding device which is inexpensive and easy to manufacture and use.

Other objects and further scope of applicability of the present invention will become apparent from the detailed description to follow, taken in conjunction with the accompanying drawing.

SUMMARY OF THE INVENTION

This invention relates to an improved closing and holding device. The device of the invention comprises a main body, at least one zig-zag shaped access slit, and at least one opening. The access slit provides access from the edge of the main body to the opening. The access slit may be formed by lancing, blanking, or other means, common to the art.

In one alternative embodiment, the device of the invention further comprises an extended labeling section which is connected to or integrally formed with the main body. In another embodiment, the opening of the device of the invention has gripping means, such as slots, teeth, or threads. In yet another embodiment, the device of the invention further comprises multiple openings each with an access slit. Other embodiments include wrapping means and an access indentation. The device of the invention may be artistically designed.

DESCRIPTION OF THE PREFERRED EMBODIMENT

This invention relates to an improved closing and holding device. The device provides superior closing and gripping capabilities to prior art devices.

The device of the invention comprises a generally flat main body having at least one zig-zag shaped access slit which leads to an opening. The device is especially useful as a closer, for closing objects such as plastic bags, although the device is also useful as a holder for straight objects, such as scarves and shoelaces. The device of the invention is also useful for decorations, product description, identification, and advertising.

Figure 1:
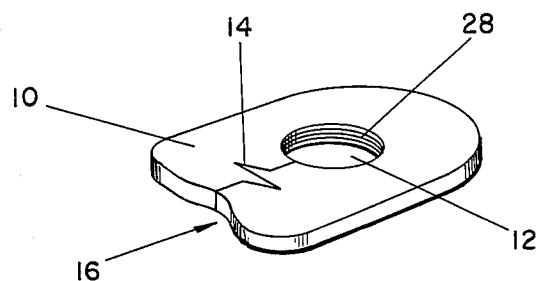
FIG. 1 is a perspective view of a device of the invention, having an access indentation and a threaded opening.

FIG. 1 illustrates one embodiment of the invention, in which the main body 10 of the device of the invention comprises a circular opening 12, and a zig-zag shaped access slit 14. Preferably, the device further comprises an access indentation 16 so that an object may be more easily placed into the device. An access indentation 16 is also useful for use with automatic packaging equipment, available in the prior art.

The access slit 14 is formed by means, common to the art, such as lancing, blanking, or molding. By the lancing process, the main body is sharply pierced to form a slit so that the lanced edges do not form a space or opening along the slit. By the blanking process, the main body is sharply pierced to form a narrow opening as the slit. By the molding process, a narrow opening slit is formed in the main body.

During operation of the device shown in FIG. 1, an object to be closed or held is pushed through the access slit 14 until it is seated in the opening 12. The access slit 14 is a narrow slit from the edge of the main body 10 to the opening 12. The main body 10 is made of a flexible or semi-rigid material such that the access slit 14 can spread apart to allow the object to be pushed through the access slit 14 into the opening 12. The thickness, shape and flexibility of the device of the invention depends on the desired closing or holding capability.

Figure 2:
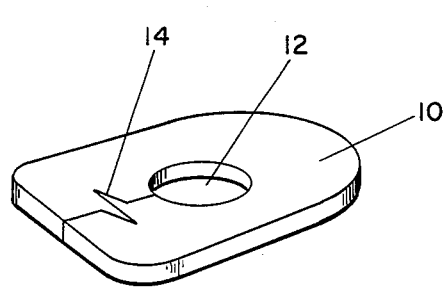
FIG. 2 is a perspective view of a device of the invention, having a sloped zig-zag shape which is useful for the access slit of the invention.
Figure 3:
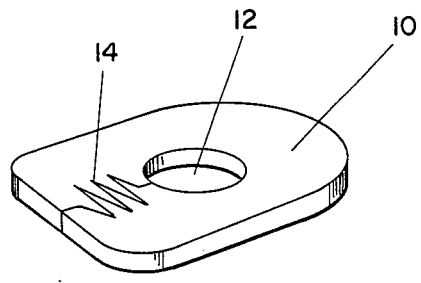
FIG. 3 is a perspective view of a device of the invention, having a sloped zig-zag shape which is useful for the access slit of the invention.
Figure 4:
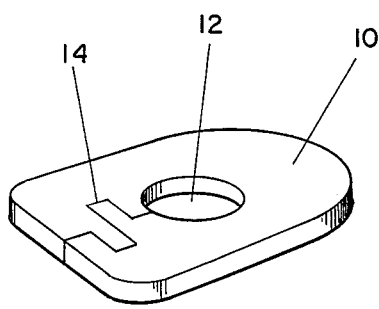
FIG. 4 is a perspective view of a device of the invention, having a rectangular zig-zag shape which is useful for the access slit of the invention.
Figure 5:
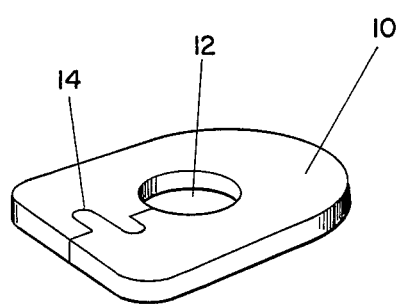
FIG. 5 is a perspective view of a device of the invention, having a curvilinear zig-zag shape which is useful for the access slit of the invention.

The zig-zag shaped access slit in the device of the invention is an improvement over prior art closer and holder access slits in that the object cannot easily escape from the opening due to the zig-zag shape of the access slit. FIGS. 2-5 illustrate zig-zag shapes which are useful for the access slit of the device of the invention. FIG. 2 illustrates a small number of turns to the zig-zag shape, whereas FIG. 3 illustrates a large number of turns to the zig-zag shape. FIGS. 2 and 3 illustrate a sloped zig-zag shape, whereas FIG. 4 illustrates a square or rectangular shape, and FIG. 5 illustrates a serpentine or curvilinear shape. As used throughout the specification and claims, the term "zig-zag" means a line that proceeds with sharp turns. These sharp turns may be abrupt (FIGS. 1-4) or curved (FIG. 5). Note that the zig-zag access slit may begin immediately at the edge of the main body 10 as shown in FIG. 9, or at access indentation 16 as shown in FIG. 7, or the zig-zag may proceed from a short, straight slit line as shown in FIGS. 1-6, 8, 10 and 11.

Figure 6:
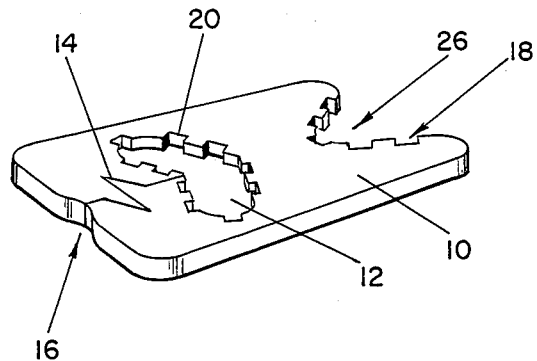
FIG. 6 is a perspective view of a device of the invention, having a V-shaped opening with slots, and a wrapping indentation.

In an alternative embodiment, as shown in FIG. 6, the opening 12 is V-shaped. Such a shape is useful for thick objects. It is preferable to have the tips of the V-shaped opening 12 shaped upward towards the slit 14 because objects will tend to follow this shape when placed into the device of the invention, further reducing the chances of escape of the object from the opening 12. Although the drawing illustrates only circular and V-shaped openings, other shaped openings could be utilized in the device of the invention. For example, the opening could be square or rectangular shaped.

FIG. 6 also illustrates a preferred embodiment of the invention in which the device further comprises wrapping means, such as a wrap indentation 26 containing slots or teeth 18. During operation of the device shown in FIG. 6, an object, such as a plastic bag, is pushed through the access slit 14 into the opening 12, so that the end of the object is sticking out of the front of the opening 12. The end of the object is then wrapped around and through the wrap indentation 26 from the front to the back of the main body 10, up to the top and back of the main body 10. The object is then pushed through the access slit 14 a second time into the opening 12 so that the end of the object again sticks out of the front of the opening 12. Such an operation assures that there will be no slippage of the device of the invention.

Figure 7:
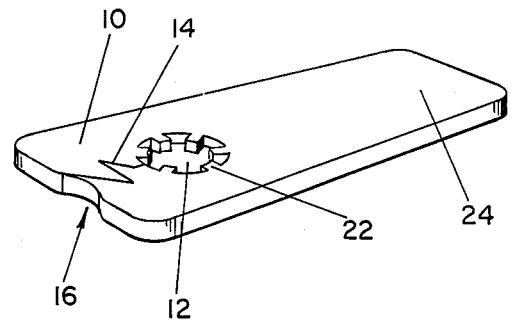
FIG. 7 is a perspective view of a device of the invention having a label section and an opening with teeth.
Figure 8:
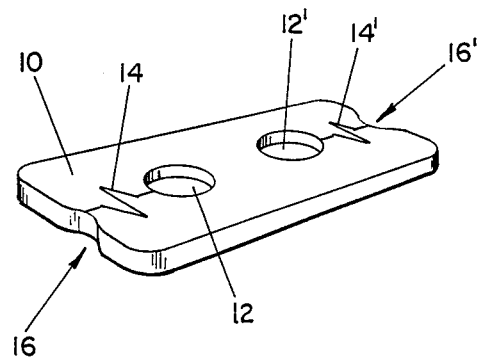
FIG. 8 is a perspective view of a device of the invention having two openings.
Figure 9:
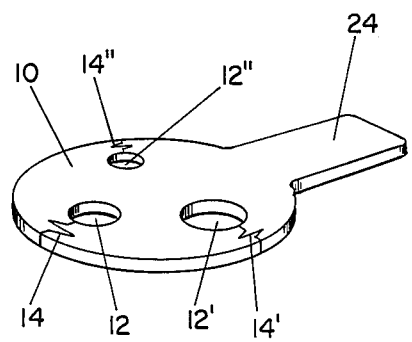
FIG. 9 is a perspective view of a device of the invention having three different-sized openings and a labeling section.

Preferably, the main body 10 of the device of the invention comprises a labeling section 24 as shown in FIGS. 7 and 9. This labeling section 24 is useful for a consumer to provide a written description relating to the object, and for a manufacturer to provide a product description, identification or advertising. Such a labeling section could be easily added to any device of the invention, including the two-opening device such as is shown in FIG. 8.

FIGS. 6 and 7 illustrate preferred embodiments of the invention in which the openings 12 comprise gripping means. The gripping means shown in FIG. 6 is a series of slots 20 which are disposed outward from the opening 12. FIG. 7 illustrates an alternative gripping means in the form of teeth 22 which are radially disposed inward from the opening 12. The gripping means provides an improved closing and holding capability when the device of the invention is operated. Although the drawing illustrates only "teeth" and "slots" as gripping means, other gripping means, common to the art, may be utilized in the device of the invention. For example, FIG. 1 shows threads or grooves 28 around the inside surface of the opening which serve as gripping means.

Preferably, the device of the invention comprises more than one opening as shown in FIGS. 8 and 9. FIG. 8 illustrates two openings 12 and 12'. These two openings provide improved closing and holding capability. FIG. 9 illustrates three different-sized openings 12, 12' and 12". The three different-sized opening device offers the user a wide range of use, since the three openings provide opportunities for a wide range of object sizes. Although the drawing illustrates devices which have one through three openings, the device of the invention may comprise more openings if desired. The openings may be of a similar size as shown in FIG. 8 or they may be of different sizes as shown in FIG. 9.

During operation of a two-opening device as shown in FIG. 8, an object, such as a plastic bag, is pushed through the access slit 14 into the opening 12 so that the end of the object sticks out of the opening 12 at the front of the main body 10. The end of the main body 10 containing the opening 12' is rotated up and the object is pushed through the access slit 14' into the opening 12'. This double gripping significantly improves the closing or holding capabilities of the device.

Figure 10:
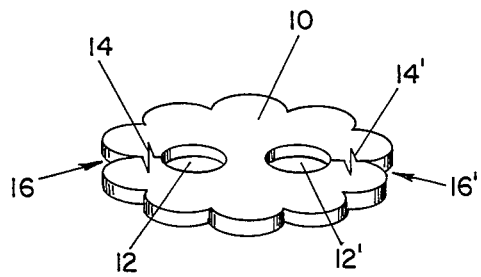
FIG. 10 is a perspective view of a device of the invention in the artistic design of a flower.

FIG. 10 of the drawing illustrates the device of the invention made into an artistic design. The particular design of FIG. 10 is a flower. The center of the flower forms two openings 12 and 12'. Access slits 14 and 14' provide access from the edges of the main body 10 to the openings 12 and 12'. This design is useful, for example, for children to wear on their shoelaces for decoration, or as closers for decorative packaging of plastic bags. Various other artistic designs can be utilized with the device of the invention, such as automobiles, airplanes, guns, flags, insects, and animals.

Figure 11:
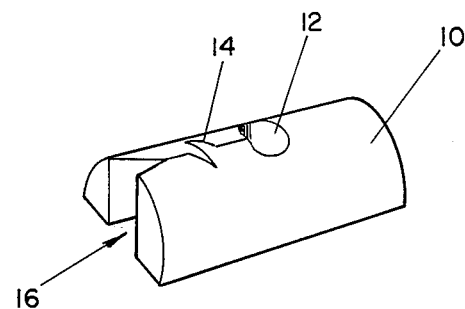
FIG. 11 is a perspective view of the device of the invention in a half-cylinder shape.

FIG. 11 of the drawing illustrates a device of the invention which is in a half-cylinder shape. The increased thickness and increased rigidity provides improved closing and holding capabilities for objects which tend to place a high amount of stress on the opening and access slit. Other geometric forms or shapes, such as a full cylinder, cubes, triangles, or spheres may also be utilized for the device of the invention.

In summary, the device of the invention comprises at least one zig-zag shaped access slit and at least one opening. Multiple holes, labels, gripping means, wrapping means, access indentations, artistic designs and geometric shapes, are all alternative embodiments of the device of the invention.

Although the invention has been described with reference to these preferred embodiments, other embodiments can achieve the same results. Variations and modifications of the present invention will be obvious to those skilled in the art and it is intended to cover in the appended claims all such modifications and equivalents.

I claim:
1. A closing or holding device comprising:
   a main body, said main body comprising a flexible material;
   at least one orifice in said main body in which an object, when provided, is to be closed or held, said orifice comprising gripping means at its surface, said gripping means comprising teeth which are inwardly disposed from said orifice and spaced equidistant around the orifice so that the space between each tooth is approximately equal; and
   at least one access and retaining slit having opposing, zig-zag shaped members, said zig-zag shaped access and retaining slit extending from outside said main body into said orifice, wherein said zig-zag shaped access and retaining slit separates to provide access into said orifice from outside said main body for allowing the object to be pushed through said zig-zag shaped access and retaining slit and into said orifice, after which said zig-zag shaped access and retaining slit closes to retain the object in the orifice.

2. A closing or holding device comprising:
a main body, said main body comprising a flexible material;
at least one orifice in said main body in which an object, when provided, is to be closed or held, said main body comprising gripping means at the surface of the orifice, said gripping means comprising slots which are outwardly disposed from said orifice and spaced equidistant around the orifice so that the space between each slot is approximately equal; and
at least one access and retaining slit having opposing, zig-zag shaped members, said zig-zag shaped access and retaining slit extending from outside said main body into said orifice, wherein said zig-zag shaped access and retaining slit separates to provide access into said orifice from outside said main body for allowing the object to be pushed through said zig-zag shaped access and retaining slit and into said orifice, after which said zig-zag shaped access and retaining slit closes to retain the object in the orifice.

3. A closing or holding device comprising:
a main body, said main body comprising a flexible material;
at least one orifice in said main body in which an object when provided, is to be closed or held, said main body comprising gripping means at the surface of the orifice, said gripping means comprising threads which are on the inside surface of the orifice; and
at least one access and retaining slit having opposing zig-zag shaped members, said zig-zag shaped access and retaining slit extending from outside said main body into said orifice, wherein said zig-zag shaped access and retaining slit separates to provide access into said orifice from outside said main body for allowing the object to be pushed through said zig-zag shaped access and retaining slit and into said orifice, after which said zig-zag shaped access and retaininag slit closes to retain the object in the orifice.

4. A closing or holding device comprising:
a main body, said main body comprising a flexible material;
at least one orifice in said main body in which an object, when provided, is to be closed or held;
at least one access and retaining slit having opposing, zig-zag shaped members, said zig-zag shaped access and retaining slit extending from outside said main body into said orifice, wherein said zig-zag shaped access and retaining slit separates to provide access into said orifice from outside said main body for allowing the object to be pushed through said zig-zag shaped access and retaining slit and into said orifice, after which said zig-zag shaped access and retaining slit closes to retain the object in the orifice; and
said main body further comprising wrapping means for wrapping the object around said main body, wherein said wrapping means comprises an indentation at the outside of said main body positioned in a different location on the outside of said main body than said zig-zag shaped access and retaining slit, said wrap indentation comprising teeth.

5. A closing or holding device comprising:
a main body, said main body comprising a flexible material;
at least one orifice in said main body in which an object, when provided, is to be closed or held;
at least one access and retaining slit having opposing, zig-zag shaped members, said zig-zag shaped access and retaining slit extending from outside said main body into said orifice, wherein said zig-zag shaped access and retaining slit separates to provide access into said orifice from outside said main body for allowing the object to be pushed through said zig-zag shaped access and retaining slit and into said orifice, after which said zig-zag shaped access and retaining slit closes to retain the object in the orifice; and
said main body further comprising wrapping means for wrapping the object around said main body, wherein said wrapping means comprises an indentation at the outside of said main body positioned in a different location on the outside of said main body than said zig-zag shaped access and retaining slit, said wrap indentation comprising slots.

* * * * *